(12) United States Patent
Barbas et al.

(10) Patent No.: US 11,768,833 B2
(45) Date of Patent: Sep. 26, 2023

(54) OPTIMIZING RELATIONAL ONLINE ANALYTICAL PROCESSING SORT OPERATIONS

(71) Applicant: International Business Machines Corporation, Armonk, NY (US)

(72) Inventors: Pedro Miguel Barbas, Dunboyne (IE); David Kelly, Robertstown (IE); Jan Mahon, Dublin (IE); Donald Fraser, Balbriggan (IE)

(73) Assignee: International Business Machines Corporation, Armonk, NY (US)

( * ) Notice: Subject to any disclaimer, the term of this patent is extended or adjusted under 35 U.S.C. 154(b) by 315 days.

(21) Appl. No.: 16/520,418

(22) Filed: Jul. 24, 2019

(65) Prior Publication Data
US 2021/0026852 A1 Jan. 28, 2021

(51) Int. Cl.
*G06F 16/2453* (2019.01)
*G06F 16/28* (2019.01)
*G06F 16/25* (2019.01)

(52) U.S. Cl.
CPC ...... *G06F 16/24537* (2019.01); *G06F 16/254* (2019.01); *G06F 16/283* (2019.01)

(58) Field of Classification Search
CPC . G06F 16/24537; G06F 16/254; G06F 16/283
See application file for complete search history.

(56) References Cited

U.S. PATENT DOCUMENTS

| | | | | |
|---|---|---|---|---|
| 5,619,692 A | * | 4/1997 | Malkemus | ........ G06F 16/24537 |
| 6,298,342 B1 | * | 10/2001 | Graefe | .................. G06F 16/284 |
| | | | | 707/602 |
| 2013/0275365 A1 | | 10/2013 | Wang et al. | |
| 2014/0172776 A1 | | 6/2014 | Liu et al. | |
| 2017/0139989 A1 | * | 5/2017 | Weyerhaeuser | .. G06F 16/24537 |

FOREIGN PATENT DOCUMENTS

WO 2018197084 A1 11/2018

OTHER PUBLICATIONS

Jayaram, Prashanth. "Overview of the SQL Row_Number Function," printed Nov. 13, 2018. Available: https://www.sqlshack.com/overview-of-the-sql-row-number-function/. (Year: 2018).*

* cited by examiner

*Primary Examiner* — Charles D Adams
(74) *Attorney, Agent, or Firm* — Scott S. Dobson

(57) ABSTRACT

Concepts for processing a SQL statement comprising a ROLAP sort operation are presented. One such concept comprises: determining whether a ROLAP partitioning column of the SQL statement does not refer to database columns from a sort operation of the SQL statement; and determining whether the ROLAP partitioning columns of the SQL statement are all referenced in the output of the SQL statement. Responsive to determining a ROLAP partitioning column of the SQL statement does not refer to database columns from a sort operation of the SQL statement, and to determining all of the ROLAP partitioning columns of the SQL statement are referenced in the output of the SQL statement, the SQL statement is modified by removing the ROLAP sort operation from the SQL statement.

13 Claims, 4 Drawing Sheets

OPTIMIZING RELATIONAL ONLINE ANALYTICAL PROCESSING SORT OPERATIONS

BACKGROUND

The present disclosure relates generally to Structured Query Language (SQL) statements, and more particularly to processing a SQL statement for a column- or row-organized relational database.

Some relational database management systems (DBMS) may store data in column- and row-organized storage formats. In row-major ordering, a multidimensional array is stored so that rows are positioned one after the other. For example, a simple two-dimensional array such as:

| 1 | 2 | 3 |
|---|---|---|
| 4 | 5 | 6 | is stored linearly as [1 2 3 4 5 6]. Conversely, when stored in column-major ordering, the two-dimensional array is stored as [1 4 2 5 3 6].

SUMMARY

The present disclosure seeks to provide a computer-implemented method, computer program product, and system for processing a SQL statement comprising a Relational OnLine Analytical Processing (ROLAP) sort operation.

According to an aspect of the present disclosure there is provided a computer-implemented method, computer program product, and system for processing a SQL statement comprising a ROLAP sort operation. The method comprises determining whether a ROLAP partitioning column of the SQL statement does not refer to database columns from a sort operation of the SQL statement. The method also comprises determining whether the ROLAP partitioning columns of the SQL statement are all referenced in the output of the SQL statement. Responsive to determining a ROLAP partitioning column of the SQL statement does not refer to database columns from a sort operation of the SQL statement, and to determining all of the ROLAP partitioning columns of the SQL statement are referenced in the output of the SQL statement, the SQL statement is modified by removing the ROLAP sort operation from the SQL statement so as to generate a modified SQL statement.

According to another aspect of the disclosure, there is provided a computer-implemented method, computer program product, and system for processing a SQL statement comprising a ROLAP sort operation. The method comprises determining whether a ROLAP partitioning row of the SQL statement does not refer to database rows from a sort operation of the SQL statement. The method also comprises determining whether the ROLAP partitioning rows of the SQL statement are all referenced in the output of the SQL statement. Responsive to determining a ROLAP partitioning row of the SQL statement does not refer to database rows from a sort operation of the SQL statement, and to determining all of the ROLAP partitioning rows of the SQL statement are referenced in the output of the SQL statement, the SQL statement is modified by removing the ROLAP sort operation from the SQL statement so as to generate a modified SQL statement.

The above summary is not intended to describe each illustrated embodiment or every implementation of the present disclosure.

BRIEF DESCRIPTION OF THE DRAWINGS

Preferred embodiments of the present disclosure will now be described, by way of example only, with reference to the following drawings, in which.

DETAILED DESCRIPTION

Figure 1:
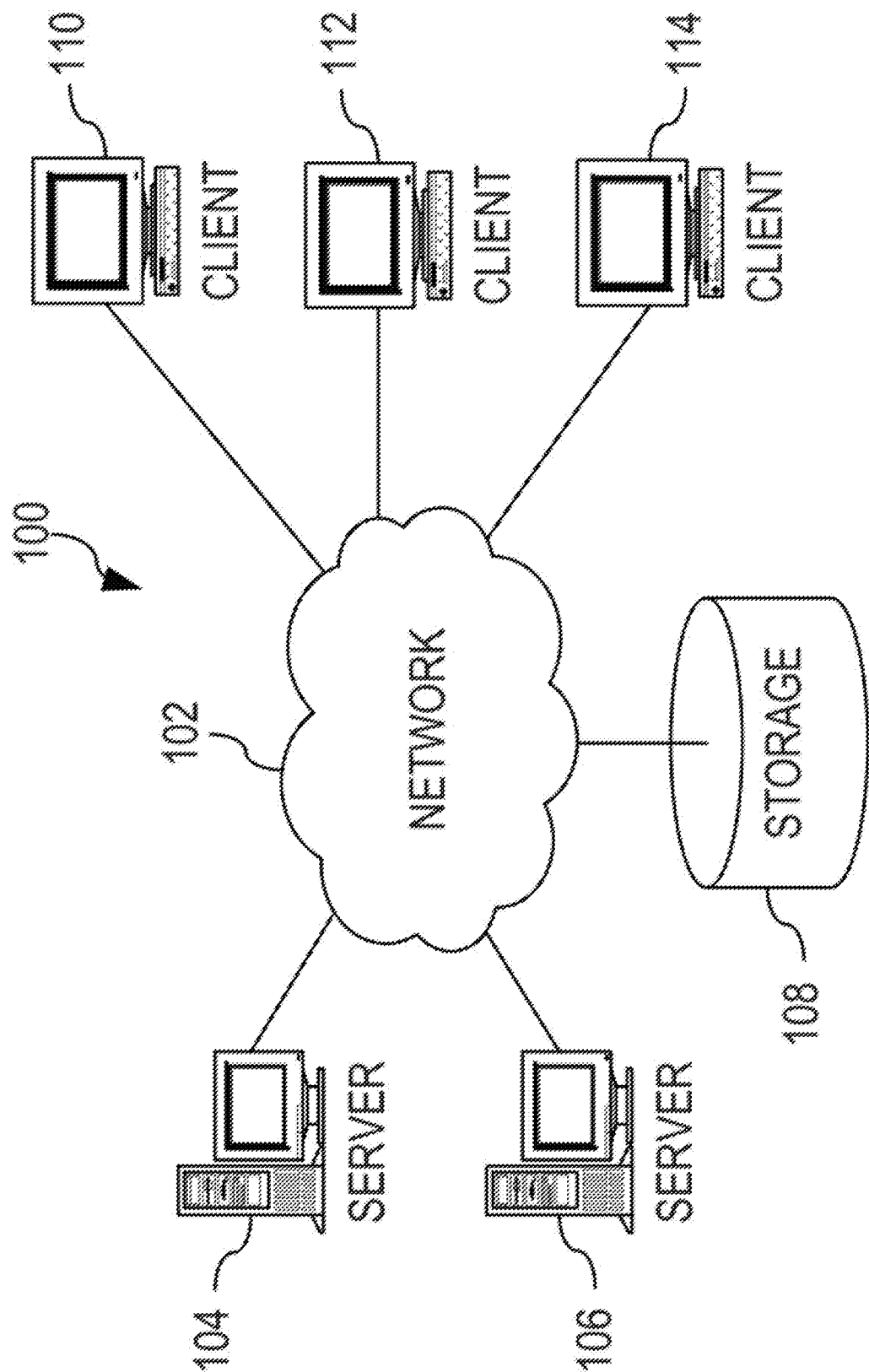
FIG. 1 depicts a pictorial representation of an example distributed system in which aspects of the illustrative embodiments may be implemented.

It should be understood that the Figures are merely schematic and may not be drawn to scale. It should also be understood that the same reference numerals are used throughout the Figures to indicate the same or similar parts.

In the context of the present application, where embodiments of the present disclosure constitute a method, it should be understood that such a method may be a process for execution by a computer (e.g., may be a computer-implementable method). The various steps of the method may therefore reflect various parts of a computer program, e.g. various parts of one or more algorithms.

Also, in the context of the present application, a system may be a single device or a collection of distributed devices that are adapted to execute one or more embodiments of the methods of the present disclosure. For instance, a system may be a personal computer (PC), a server or a collection of PCs and/or servers connected via a network such as a local area network, the Internet and so on to cooperatively execute at least one embodiment of the methods of the present disclosure.

There is proposed a concept for optimizing SQL query processing for a relational database that is organized in a column-major layout (e.g., a column-major format, wherein data may be organized/stored column-by-column). In particular, various SQL query modification approaches are proposed, and these may, for example, be selected from based on a comparison of measured performance over time for ongoing use of particular queries. Embodiments may therefore rewrite (e.g., modify) a SQL statement to improve CPU and memory utilization.

Column-major layout has emerged as a common scheme for organizing data in data warehouses because this layout results in reduced IO requirements for queries. This is because each query needs to scan only the columns that it references. The queries may include Relational OnLine Analytical Processing (ROLAP) functions for sorting aggregation data in the column-major relational database. ROLAP is a form of OnLine Analytical Processing (OLPA) that performs dynamic multidimensional analysis of data stored in a relational database rather than in a multidimensional database (which is usually considered the OLAP standard.

Implementing a ROLAP query operation in a column-major format can be challenging because a ROLAP operation typically involves high CPU and memory utilization. Additionally, if there is not enough memory, a ROLAP operation "spills" to disk storage, using more system resources and requiring complex algorithms. Further, stitching together scan results of operations over individual columns is complicated by the column-major layout.

Various approaches have been developed for generating execution plans for queries with column-major ordering compared to queries containing only row-major on-disk tables. One approach is to make no changes to the query optimizer, based on the expectation that the change in table scan performance will make the queries perform better. However, an execution plan generated by an optimizer designed for an on-disk row-major format may be suboptimal on a column-major format. Consequently, database management systems (DBMS) are normally prepared to have specific query optimizer engines to fit only row-major layouts or, instead, column-major layout formats.

Proposed embodiments may be configured to modify a SQL statement comprising a ROLAP sort operation by removing the ROLAP sort operation from the SQL statement to generate a modified SQL statement. Further, some embodiments may also modify a SQL statement by processing the SQL statement as a row organized relational database statement. Embodiments may thus facilitate the generation of a modified (e.g., improved or optimized) SQL statement for a column-organized relational DBMS. Improved approaches for processing ROLAP aggregated data in a column organized relational database may therefore be provided by proposed concepts.

Embodiments of the present disclosure may help to better utilize the capabilities of a database optimizer engine. This may address the issue that the majority of conventional database implementations do not contain sufficient capabilities for an optimizer engine to deal with both row- and column-based tables in an optimal manner. Thus, proposed embodiments may introduce a concept of virtualizing a column-based table as a row-based table, or vice-versa.

In this way, a database optimizer engine may be enhanced with, for example, two extra options: (i) the capability of transforming a ROLAP SQL statement into an modified (e.g., improved/optimised) SQL statement; and (ii) an extra capability of running the modified SQL statement as row-based or column-based (e.g., depending on the one that is the best for optimizing).

Proposed embodiments may thus provide the capability of virtualizing a 'column based' SQL statement into a 'row based' SQL statement (or vice-versa).

Proposed embodiments introduce concepts for rewriting a SQL query statement comprising at least one ROLAP operation for column-major database tables (or row-major database tables). Such proposals provide significant performance improvements (e.g., in terms of CPU and memory utilization). Also, proposed embodiments may also allow for further performance improvements by transforming a generated column-major query plan into a new pseudo-virtual row-major query plan.

Embodiments may be implemented in conjunction with column-organized relational DBMSs (or row-organized relational DBMSs) to improve CPU and memory utilization.

A tool for enabling automated improvement or optimization of SQL statements may therefore be provided by a proposed embodiment. This may be used to edit or produce optimized SQL statement for relational DBMSs.

Embodiments may be useful for a wide range of applications, such as: commercial/consumer application software, middleware, and operating systems; methods, processes, and or code associated with processor improvements; social media and marketing; hand-held computing devices; health care; and Internet of Things (IoT).

Illustrative embodiments may provide concepts for modifying (e.g., rewriting) a SQL statement for improved performance in a column-major organized relational database (or a row-major organized relational database), and such concepts may be implemented automatically and in real-time. Dynamic SQL statement modification and/or generation concepts may therefore be provided by proposed embodiments. Modifications and additional steps to a traditional SQL statement handling or processing systems may also be proposed which may enhance the value and utility of the proposed concepts.

FIG. 1 depicts a pictorial representation of an exemplary distributed system in which aspects of the illustrative embodiments may be implemented. Distributed system 100 may include a network of computers in which aspects of the illustrative embodiments may be implemented. The distributed system 100 contains at least one network 102, which is the medium used to provide communication links between various devices and computers connected together within the distributed data processing system 100. The network 102 may include connections, such as wire, wireless communication links, or fiber optic cables.

In the depicted example, a first 104 and second 106 servers are connected to the network 102 along with a storage unit 108. In addition, clients 110, 112, and 114 are also connected to the network 102. The clients 110, 112, and 114 may be, for example, personal computers, network computers, or the like. In the depicted example, the first server 104 provides data, such as boot files, operating system images, and applications to the clients 110, 112, and 114. Clients 110, 112, and 114 are clients to the first server 104 in the depicted example. The distributed processing system 100 may include additional servers, clients, and other devices not shown.

In the depicted example, the distributed system 100 is the Internet with the network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, the distributed system 100 may also be implemented to include a number of different types of networks, such as for example, an intranet, a local area network (LAN), a wide area network (WAN), or the like. As stated above, FIG. 1 is intended as an example, not as an architectural limitation for different embodiments of the present disclosure, and therefore, the particular elements shown in FIG. 1 should not be considered limiting with regard to the environments in which the illustrative embodiments of the present disclosure may be implemented.

Figure 2:
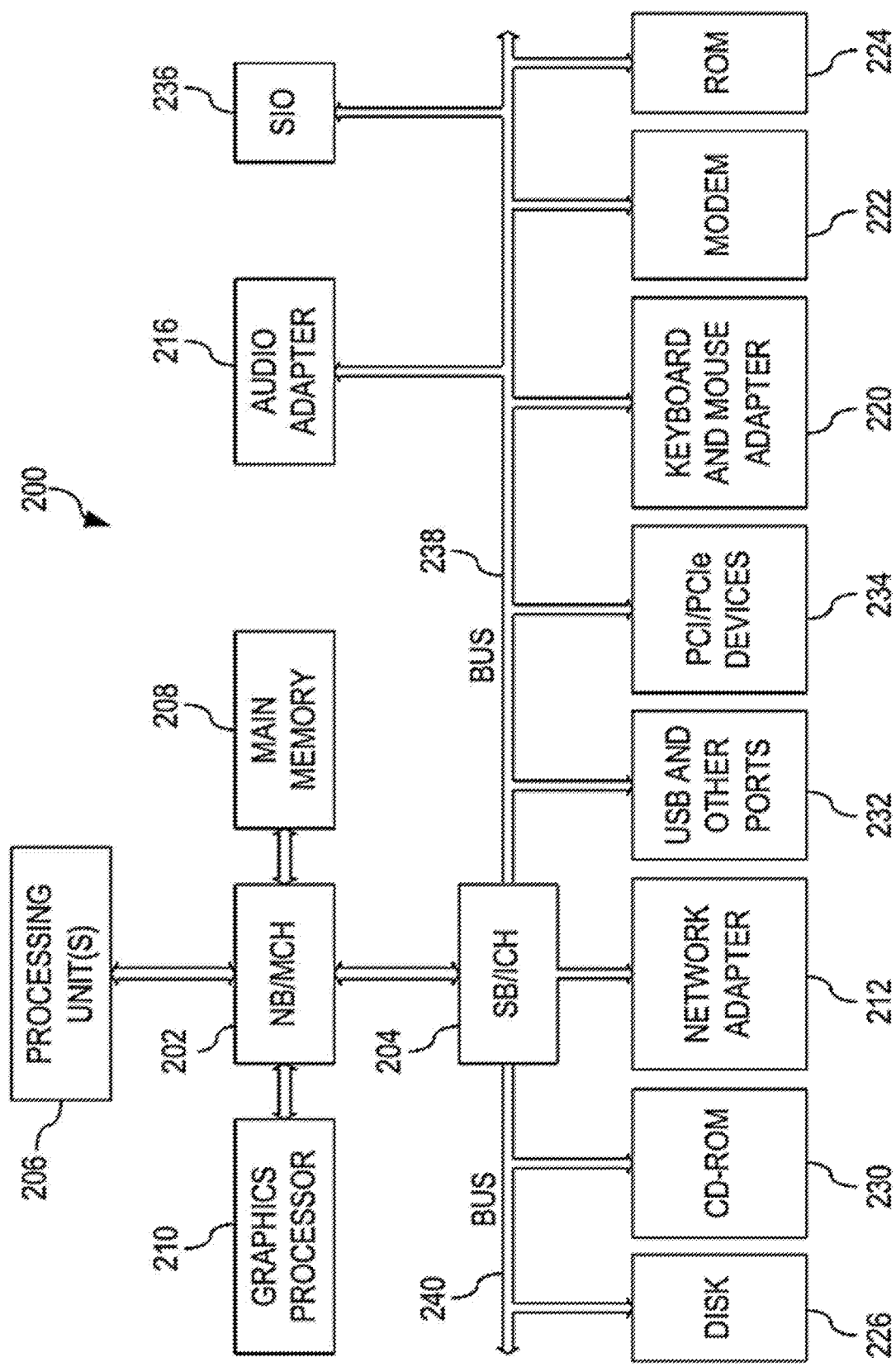
FIG. 2 is a block diagram of an example system in which aspects of the illustrative embodiments may be implemented.

FIG. 2 is a block diagram of an example system 200 in which aspects of the illustrative embodiments may be implemented. The system 200 is an example of a computer, such as client 110 in FIG. 1, in which computer usable code or instructions implementing the processes for illustrative embodiments of the present disclosure may be located.

In the depicted example, the system 200 employs a hub architecture including a north bridge and memory controller hub (NB/MCH) 202 and a south bridge and input/output (I/O) controller hub (SB/ICH) 204. A processing unit 206, a main memory 208, and a graphics processor 210 are connected to NB/MCH 202. The graphics processor 210 may be connected to the NB/MCH 202 through an accelerated graphics port (AGP).

In the depicted example, a local area network (LAN) adapter 212 connects to SB/ICH 204. An audio adapter 216, a keyboard and a mouse adapter 220, a modem 222, a read only memory (ROM) 224, a hard disk drive (HDD) 226, a CD-ROM drive 230, a universal serial bus (USB) ports and other communication ports 232, and PCI/PCIe devices 234 connect to the SB/ICH 204 through first bus 238 and second bus 240. PCI/PCIe devices may include, for example, Ethernet adapters, add-in cards, and PC cards for notebook computers. PCI uses a card bus controller, while PCIe does not. ROM 224 may be, for example, a flash basic input/output system (BIOS).

The HDD 226 and CD-ROM drive 230 connect to the SB/ICH 204 through second bus 240. The HDD 226 and CD-ROM drive 230 may use, for example, an integrated drive electronics (IDE) or a serial advanced technology attachment (SATA) interface. Super I/O (SIO) device 236 may be connected to SB/ICH 204.

An operating system runs on the processing unit 206. The operating system coordinates and provides control of various components within the system 200 in FIG. 2. As a client, the operating system may be a commercially available operating system. An object-oriented programming system, such as the Java™ programming system, may run in conjunction with the operating system and provides calls to the operating system from Java™ programs or applications executing on system 200. (Java and all Java-based trademarks and logos are trademarks or registered trademarks of Oracle and/or its affiliates.)

As a server, system 200 may be, for example, an IBM® eServer™ System p computer system, running the Advanced Interactive Executive (AIX®) operating system or the LINUX® operating system. The system 200 may be a symmetric multiprocessor (SMP) system including a plurality of processors in processing unit 206. Alternatively, a single processor system may be employed. (Linux is a registered trademark of Linus Torvalds in the United States, other countries, or both. IBM, eServer and AIX are trademarks of International Business Machines Corporation in the United States and/or other countries.)

Instructions for the operating system, the programming system, and applications or programs are located on storage devices, such as HDD 226, and may be loaded into main memory 208 for execution by processing unit 206. Similarly, one or more message processing programs according to an embodiment may be adapted to be stored by the storage devices and/or the main memory 208.

The processes for illustrative embodiments of the present disclosure may be performed by processing unit 206 using computer usable program code, which may be located in a memory such as, for example, main memory 208, ROM 224, or in one or more peripheral devices 226 and 230.

A bus system, such as first bus 238 or second bus 240 as shown in FIG. 2, may comprise one or more buses. Of course, the bus system may be implemented using any type of communication fabric or architecture that provides for a transfer of data between different components or devices attached to the fabric or architecture. A communication unit, such as the modem 222 or the network adapter 212 of FIG. 2, may include one or more devices used to transmit and receive data. A memory may be, for example, main memory 208, ROM 224, or a cache such as found in NB/MCH 202 in FIG. 2.

Those of ordinary skill in the art will appreciate that the hardware in FIGS. 1 and 2 may vary depending on the implementation. Other internal hardware or peripheral devices, such as flash memory, equivalent non-volatile memory, or optical disk drives and the like, may be used in addition to or in place of the hardware depicted in FIGS. 1 and 2. Also, the processes of the illustrative embodiments may be applied to a multiprocessor data processing system, other than the system mentioned previously, without departing from the spirit and scope of the present disclosure.

Moreover, the system 200 may take the form of any of a number of different data processing systems including client computing devices, server computing devices, a tablet computer, laptop computer, telephone or other communication device, a personal digital assistant (PDA), or the like. In some illustrative examples, the system 200 may be a portable computing device that is configured with flash memory to provide non-volatile memory for storing operating system files and/or user-generated data, for example. Thus, the system 200 may essentially be any known or later-developed data processing system without architectural limitation.

A proposed concept may provide for ROLAP optimization for column-major-ordered database systems.

Figure 3:
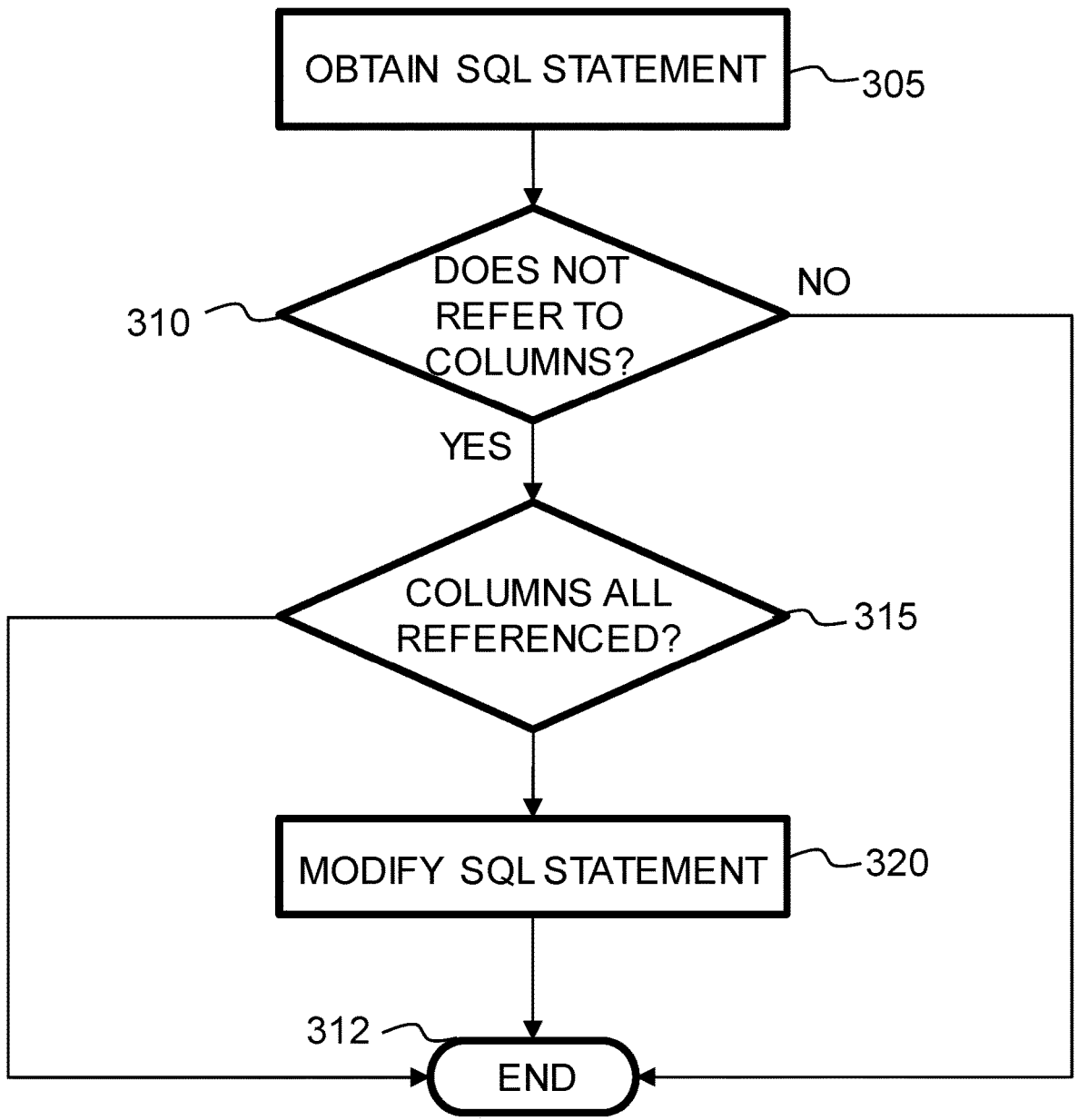
FIG. 3 is a simplified flow diagram of a computer-implemented method for processing a SQL statement comprising at a ROLAP sort operation according to an embodiment.

Referring now to FIG. 3, there is illustrated a computer-implemented method for processing a SQL statement comprising a ROLAP sort operation according to an embodiment. In this example, the method begins with the step 305 of obtaining (e.g., receiving or intercepting) a SQL statement for a column-organized (e.g., a column-major layout format) relational database. Here, the SQL statement comprises a ROLAP sort operation, and thus the SQL statement comprises an ORDER BY sort operation and the output of the SQL statement comprises a SELECT output.

In step 310, it is determined whether a ROLAP partitioning column of the SQL statement does not refer to database columns from the ORDER BY sort operation of the SQL statement. If, in step 310, it is determined that all ROLAP partitioning column of the SQL statement refer to database columns from the ORDER BY sort operation (e.g., if the determination of step 310 is negative/"NO"), the method proceeds to step 312 and the method ends.

If, in step 310, it is determined that a ROLAP partitioning column of the SQL statement does not refer to database columns from the ORDER BY sort operation (e.g., if the determination of step 310 is positive/"YES"), the method proceeds to step 315.

In step 315, it is determined whether the ROLAP partitioning columns of the SQL statement are all referenced in the SELECT output of the SQL statement. If, in step 315, it is determined that not all of the ROLAP partitioning columns of the SQL statement are referenced in the SELECT output of the SQL statement (e.g., if the determination of step 315 is negative/"NO"), the method proceeds to step 312 and the method ends.

Conversely, if, in step 315, it is determined that all of the ROLAP partitioning columns of the SQL statement are referenced in the SELECT output of the SQL statement (e.g., if the determination of step 315 is positive/"YES"), the method proceeds to step 320.

In step 320, the SQL statement is modified to generate a modified SQL statement. Here, the SQL statement is modified by removing the ROLAP sort operation from the SQL statement.

From the above description, it will be understood that the method of FIG. 3 provides for the modification of the SQL statement responsive to both: (A) determining a ROLAP partitioning column of the SQL statement does not refer to database columns from a sort operation of the SQL statement; and (B) determining all of the ROLAP partitioning columns of the SQL statement are referenced in the output of the SQL statement.

To further illustrate the proposed concept(s), we now consider an exemplary table which may be used with embodiments. The exemplary table, TABLE0, is created by using the following statement:

```
CREATE TABLE TABLE0
(
    COL1 INT,
    COL2 INT,
    COL3 INT
)
ORGANIZE BY COLUMN;
INSERT INTO TABLE0 (COL1,COL2,COL3) VALUES (1,2,3);
INSERT INTO TABLE0 (COL1,COL2,COL3) VALUES (4,5,6);
INSERT INTO TABLE0 (COL1,COL2,COL3) VALUES (7,8,9);
INSERT INTO TABLE0 (COL1,COL2,COL3) VALUES (7,7,9);
INSERT INTO TABLE0 (COL1,COL2,COL3) VALUES (1,2,3);
INSERT INTO TABLE0 (COL1,COL2,COL3) VALUES (4,5,6);
INSERT INTO TABLE0 (COL1,COL2,COL3) VALUES (7,8,9);
INSERT INTO TABLE0 (COL1,COL2,COL3) VALUES (7,7,9);
INSERT INTO TABLE0 (COL1,COL2,COL3) VALUES (1,2,3);
INSERT INTO TABLE0 (COL1,COL2,COL3) VALUES (4,5,6);
INSERT INTO TABLE0 (COL1,COL2,COL3) VALUES (7,8,9);
INSERT INTO TABLE0 (COL1,COL2,COL3) VALUES (7,7,9);
```

The exemplary table TABLE0 may thus be represented as a simple two-dimensional array such as:

| 1 | 2 | 3 |
|---|---|---|
| 4 | 5 | 6 |
| 7 | 8 | 9 |
| 7 | 7 | 9 |
| 1 | 2 | 3 |
| 4 | 5 | 6 |
| 7 | 8 | 9 |
| 7 | 7 | 9 |
| 1 | 2 | 3 |
| 4 | 5 | 6 |
| 7 | 8 | 9 |
| 7 | 7 | 9 |

The above exemplary table is included only for the purposes of explanation of the operation of embodiments of the disclosure. It will therefore be appreciated that embodiments may be used with any tables and no restrictions are intended or are to be implied by the inclusion of the example table. Also, in the following description, numerous specific details are set forth in order to provide an understanding of embodiments. It will be apparent, however, that proposed embodiments of the present disclosure may be implemented without these specific details.

An exemplary SQL query Q1, which may be used by a database user in order to extract specific details from the exemplary table TABLE0, may be as follows:

```
Q1:
SELECT
    COUNT_BIG(COL3),
    COL1
    FROM (SELECT t1.COL3, t2.COL1,
        ROW_NUMBER( ) OVER(PARTITION BY t1.COL3, t2.COL1) As RN
            FROM TABLE0 t1 CROSS JOIN TABLE0 t2
        ORDER BY t1.COL3, t1.COL2
    )
    T WHERE RN = 1 GROUP BY COL1;
```

Q1 forms an SELECT statement with an ROLAP expression over a ORDER BY sort operation.

Query Q1 produces the following table result

| 3. | 1 |
|---|---|
| 3. | 4 |
| 3. | 7 |

An experimental use of the query Q1 using a database compiler has demonstrated that the query Q1 has an access plan with a total cost of 183.258 timerons. This (excessive) time is because the ROLAP operation involves high CPU and memory utilization in a column organized relational database.

A first embodiment of the present disclosure optimizes the query Q1 within the database compiler to provide the following modified query Q2:

```
Q2:
SELECT COUNT_BIG(DISTINCT COL3), COL1
    FROM (SELECT t1.COL3, t2.COL1
        FROM TABLE0 t1 CROSS JOIN TABLE0 t2
        ORDER BY t1.COL2
    )
    T GROUP BY COL1;
```

This produces the following table result

| 3. | 1 |
|---|---|
| 3. | 4 |
| 3. | 7 | which can be seen as being the same as that produced by the original (e.g., non-optimized or non-modified) query Q1.

An experimental use of the modified query Q2 using the same database compiler has demonstrated that the modified query Q2 has an access plan with a total cost of 44.2368 timerons (when executed as being a row organized database statement). This represents a significant reduction in total cost when compared with that of the original query Q1.

Also, when the modified Q2 is still processed as a column-organized statement, the modified query Q2 has a total cost of 183.209 timerons, which is still slightly better result than that of the original (e.g., non-optimized or non-modified) query Q1.

The accuracy of this optimization depends on the fact that, with respect to the ROLAP operation, that is ROW_NUMBER( ) OVER(PARTITION BY), corresponds with one row and only one row from the SELECT output of the SQL statement. The query result is hence one row per input tuple of the ROLAP quantifier, which is equivalent to a DISTINCT select over the SELECT sort output of the SQL statement.

According to another embodiment the original query Q1 may be modified within a database compiler to provide the following modified query Q3:

```
Q3:
SELECT COUNT_BIG(DISTINCT COL3), COL1
    FROM (
        SELECT t1.COL3, t2.COL1 FROM DYNAMIC.TABLE0 t1
CROSS JOIN DYNAMIC.TABLE0 t2
            WHERE t1.COL2 IN (SELECT MAX(t3.COL2) FROM
        DYNAMIC.TABLE0 t3
            WHERE t1.COL3 = t3.COL3 AND t1.COL1 = t3.COL1)
            ORDER BY t1.COL2
    )
T GROUP BY COL1;
```

This produces the following table result

| | |
|---|---|
| 3. | 1 |
| 3. | 4 |
| 3. | 7 | which can be seen as being the same as that produced by the original (e.g., non-optimized or non-modified) query Q1 and the modified query Q3.

An experimental use of the modified query Q3 using the same database compiler has demonstrated that the modified query Q3 has an access plan with a total cost of 42.6262 timerons (when executed as being a row organized database statement). This represents a significant reduction in total cost when compared with that of the original query Q1.

The accuracy of this optimization depends on the fact that, with respect to the ROLAP operation, that is ROW_NUMBER( ) OVER(PARTITION BY), corresponds with one row and only one row from the sort operation, that is MAX in the SELECT output of the SQL subquery. The query result is hence one row per input tuple of the ROLAP quantifier, which is equivalent to a DISTINCT select over the SELECT sort output of the SQL statement.

According to yet another embodiment the original query Q1 may be modified within a database compiler to provide the following modified query Q4:

```
Q4:
SELECT COUNT_BIG(CCOL3),CCOL1
    FROM (SELECT t1.COL3 AS CCOL3,t2.COL1 AS CCOL1
        FROM DYNAMIC.TABLE0 t1 CROSS JOIN DYNAMIC.TABLE0 t2
            GROUP BY t1.COL3,t2.COL1
    )
T GROUP BY CCOL1 ORDER BY CCOL1;
```

This modified query Q4 produces the following table result

| | |
|---|---|
| 3. | 1 |
| 3. | 4 |
| 3. | 7 | which can be seen as being the same as that produced by the original (e.g., non-optimized or non-modified) query Q1 and the modified queries Q2 and Q3.

An experimental use of the modified query Q4 using the same database compiler has demonstrated that the modified query Q4 has an access plan with a total cost of 28.1921 timerons (when executed as being a row organized database statement). This represents a significant reduction in total cost when compared with that of the original query Q1.

The accuracy of this optimization depends on the fact that, with respect to the ROLAP operation, that is ROW_NUMBER( ) OVER(PARTITION BY), corresponds with one row and only one row from the GROUP BY operation in the SELECT output of the inner SQL statement. The query output result is hence one row per input tuple of the ROLAP quantifier, which is equivalent to a DISTINCT select over the SELECT sort output of the SQL statement.

In yet another embodiment, query Q1 can be executed as row-major layout organization. For that the method of the present disclosure does not need to recreate TABLE0 as row-major on-disk table, but rather can consume the column-major layout data, and through column-major database metadata information simulate a virtual pseudo-row-major layout to be processed by the database optimizer engine.

In an example, IBM's DB2® allows the user to set database metadata by updating the system catalog tables. Similarly, optimizer statistics can be manipulated (e.g. via the package DBMS_STATS in Oracle™, using the optdiag utility in Sybase™, and using the UPDATE STATISTICS command in Microsoft SQL Server™). In DB2 for example, the relevant optimizer statistics can be set by updating the system catalog: On SYSCAT.TABLES set card, fpages, npages; On SYSCAT.COLUMNS set high2key, low2key, colcard; On SYSCAT.INDEX set nleaf, nlevels, clusterratio, sequential_pages and density. (Microsoft is a trademark of Microsoft Corporation in the United States, other countries, or both.)

Once the virtual pseudo-row-major layout optimizer statistics are computed, query Q1 may then be executed against the database optimizer engine by using an explain plan row-major layout oriented in order to compute an access path used and associated estimated cost.

According to an embodiment, the database management system may include a parser, an optimizer, an execution engine, a pseudo row-major statistics archive, a statistics computation component, a catalog, and a database. The parser is for splitting the query into several components preceding compilation and for transforming the components in a compiler definition. The parser may send the parsed statement to an optimizer. The optimizer may generate an execution plan (e.g., an access plan), which may be maintained in a query plan cache, by using statistical data stored in the pseudo row-major statistics archive. The statistical data may comprise information about the size of the virtual pseudo row-major table, the length of records, pseudo-indices required on the table and the like. Once an execution plan is generated, the execution plan may be sent to the execution engine. The execution engine may execute the query and return the result set to the database user requiring the same.

Consistency can be maintained between column-major metadata statistics and virtual pseudo row-major metadata statistics. Techniques for ensuring consistency include suspending and rating. Suspending applies the restriction that pseudo row-major copies of data are a subset of column-major on-disk data. As an example, the size of in memory pseudo row-major partitions cannot exceed the number of on-disk column-major partitions. Rating ensures that subsets of pseudo row-major virtual data should have statistics that correspond to the right sub-partition of the column-major data on disk. For example, if optimizer engine gathers column-major statistics for some in memory operations, then pseudo row-major virtual statistics on the partitioned column-major in memory data may be extrapolated as subsets of the column-major on disk statistics. Suspending can also be applied in rating statistics. Consistency ensures that the estimations using the different column-major statistics and pseudo row-major statistics are accurate.

In embodiments, parallelism (e.g., single instruction multiple data (SIMD) techniques may be employed to process multiple columns/rows in tandem, or multiple tables in tandem, thus further reducing the computing resources required to complete the operations discussed herein and increase the capabilities of the technical environment(s) in which these operations are executed.

Figure 4:
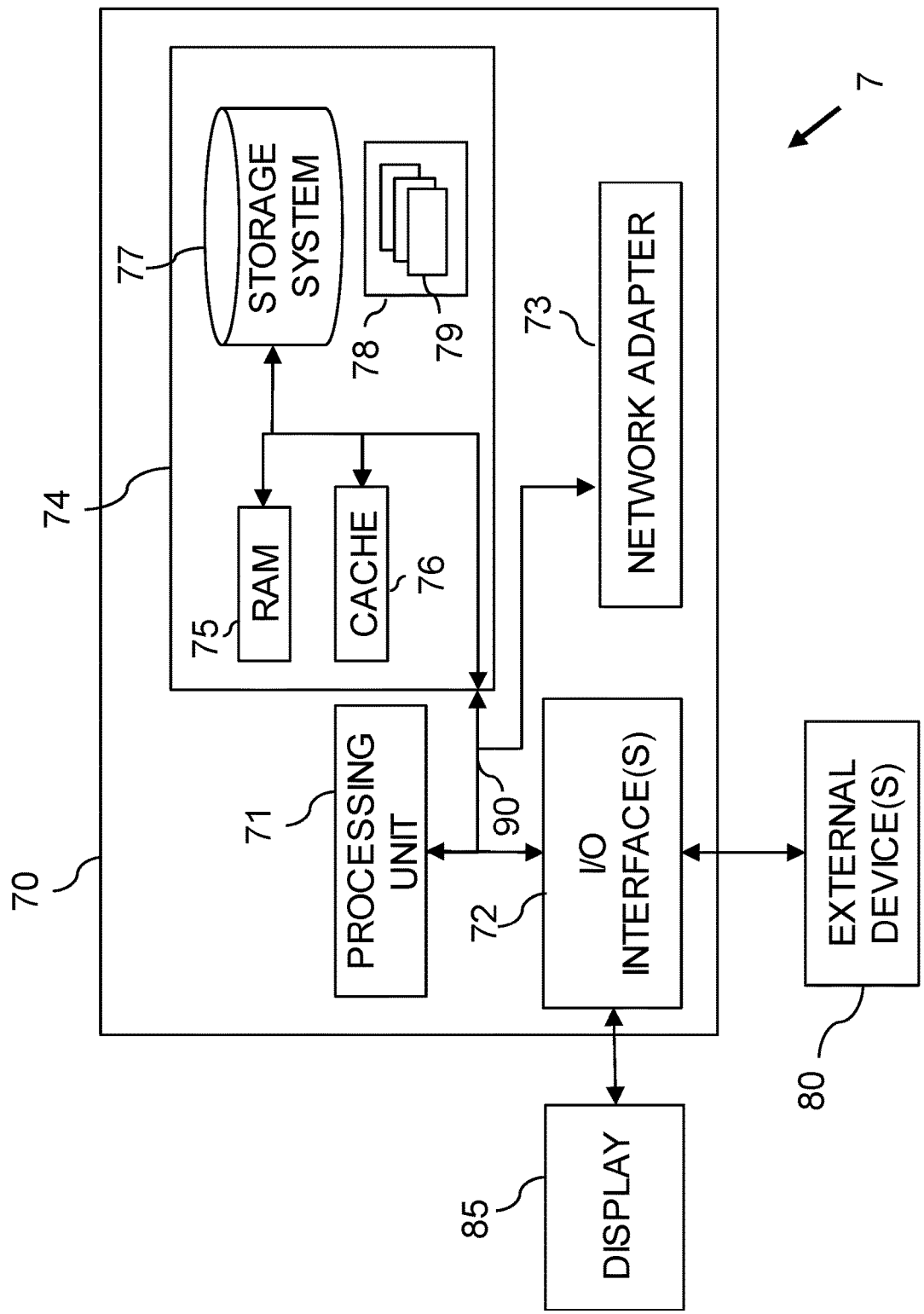
FIG. 4 is a simplified block diagram of a system according to an embodiment of the disclosure.

By way of further example, as illustrated in FIG. 4, embodiments may comprise a computer system 70, which may form part of a networked system 7. The components of computer system/server 70 may include, but are not limited to, one or more processing arrangements, for example comprising processors or processing units 71, a system memory 74, and a bus 90 that couples various system components including system memory 74 to processing unit 71.

Bus 90 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 70 typically includes a variety of computer system readable media. Such media may be any available media that is accessible by computer system/server 70, and it includes both volatile and non-volatile media, removable and non-removable media.

System memory 74 can include computer system readable media in the form of volatile memory, such as random access memory (RAM) 75 and/or cache memory 76. Computer system/server 70 may further include other removable/non-removable, volatile/non-volatile computer system storage media. By way of example only, storage system 74 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 90 by one or more data media interfaces. As will be further depicted and described below, memory 74 may include at least one program product having a set (e.g., at least one) of program modules that are configured to carry out the functions of embodiments of the disclosure.

Program/utility 78, having a set (at least one) of program modules 79, may be stored in memory 74 by way of example, and not limitation, as well as an operating system, one or more application programs, other program modules, and program data. Each of the operating system, one or more application programs, other program modules, and program data or some combination thereof, may include an implementation of a networking environment. Program modules 79 generally carry out the functions and/or methodologies of embodiments of the disclosure as described herein.

Computer system/server 70 may also communicate with one or more external devices 80 such as a keyboard, a pointing device, a display 85, etc.; one or more devices that enable a user to interact with computer system/server 70; and/or any devices (e.g., network card, modem, etc.) that enable computer system/server 70 to communicate with one or more other computing devices. Such communication can occur via Input/Output (I/O) interfaces 72. Still yet, computer system/server 70 can communicate with one or more networks such as a local area network (LAN), a general wide area network (WAN), and/or a public network (e.g., the Internet) via network adapter 73. As depicted, network adapter 73 communicates with the other components of computer system/server 70 via bus 90. It should be understood that although not shown, other hardware and/or software components could be used in conjunction with computer system/server 70. Examples, include, but are not limited to: microcode, device drivers, redundant processing units, external disk drive arrays, RAID systems, tape drives, and data archival storage systems, etc.

In the context of the present application, where embodiments of the present disclosure constitute a method, it should be understood that such a method is a process for execution by a computer, i.e. is a computer-implementable method. The various steps of the method therefore reflect various parts of a computer program, e.g. various parts of one or more algorithms.

The present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a storage class memory (SCM), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The invention claimed is:

1. A computer-implemented method for processing a Structured Query Language (SQL) statement comprising a Relational OnLine Analytical Processing (ROLAP) sort operation, the method comprising:
   determining whether a ROLAP partitioning column of the SQL statement does not refer to database columns from a sort operation of the SQL statement;
   determining whether the ROLAP partitioning columns of the SQL statement are all referenced in the output of the SQL statement;
   responsive to determining the ROLAP partitioning column of the SQL statement does not refer to database columns from the sort operation of the SQL statement and to determining all of the ROLAP partitioning columns of the SQL statement are referenced in the output of the SQL statement, modifying, by a relational database management system, the SQL statement by removing the ROLAP sort operation from the SQL statement and replacing the ROLAP sort operation with one or more operations for generating an equivalent output to generate a modified SQL statement; and executing the modified SQL statement, wherein modifying the SQL statement further comprises processing the SQL statement as a row-major organized relational database statement, and wherein processing the SQL statement as a row-major organized relational database statement comprises:

consuming column-major organized database data; and simulating a virtual row-major organized database based on column-major database metadata information associated with the consumed column-major organized database data.

2. The method of claim 1, further comprising:

processing the virtual row-major organized database with a database optimizer engine to generate optimizer statistics; and processing the SQL statement based on the optimizer statistics.

3. The method of claim 1, wherein the sort operation of the SQL statement comprises an ORDER BY sort operation.

4. The method of claim 1, wherein the output of the SQL statement comprises a SELECT output of the SQL statement.

5. The method of claim 1, wherein the ROLAP sort operation comprises a ROLAP expression ROW_NUMBER( ) OVER(PARTITION BY).

6. A computer-implemented method for processing a Structured Query Language (SQL) statement comprising a Relational OnLine Analytical Processing (ROLAP) sort operation, the method comprising:

determining whether a ROLAP partitioning row of the SQL statement does not refer to database rows from a sort operation of the SQL statement;

determining whether the ROLAP partitioning rows of the SQL statement are all referenced in the output of the SQL statement;

responsive to determining the ROLAP partitioning row of the SQL statement does not refer to database rows from the sort operation of the SQL statement and to determining all of the ROLAP partitioning rows of the SQL statement are referenced in the output of the SQL statement, modifying, by a relational database management system, the SQL statement by removing the ROLAP sort operation from the SQL statement and replacing the ROLAP sort operation with one or more operations for generating an equivalent output to generate a modified SQL statement; and executing the modified SQL statement, wherein modifying the SQL statement further comprises processing the SQL statement as a row-major organized relational database statement, and wherein processing the SQL statement as a row-major organized relational database statement comprises:

consuming column-major organized database data; and simulating a virtual row-major organized database based on column-major database metadata information associated with the consumed column-major organized database data.

7. The method of claim 6, further comprising:

processing the virtual row-major organized database with a database optimizer engine to generate optimizer statistics; and processing the SQL statement based on the optimizer statistics.

8. The method of claim 6, wherein the sort operation of the SQL statement comprises an ORDER BY sort operation.

9. The method of claim 6, wherein the output of the SQL statement comprises a SELECT output of the SQL statement.

10. A relational database management system for processing a Structured Query Language (SQL) statement comprising a Relational OnLine Analytical Processing (ROLAP) sort operation, wherein the system comprises:

a memory with program instructions stored thereon; and a processor in communication with the memory, wherein the program instructions cause the system to:

determine whether a ROLAP partitioning column of the SQL statement does not refer to database columns from a sort operation of the SQL statement;

determine whether the ROLAP partitioning columns of the SQL statement are all referenced in the output of the SQL statement;

responsive to determining the ROLAP partitioning column of the SQL statement does not refer to database columns from the sort operation of the SQL statement and to determining all of the ROLAP partitioning columns of the SQL statement are referenced in the output of the SQL statement, modify the SQL statement by removing the ROLAP sort operation from the SQL statement and replacing the ROLAP sort operation with one or more operations for generating an equivalent output to generate a modified SQL statement; and execute the modified SQL statement, wherein modifying the SQL statement further comprises processing the SQL statement as a row-major organized relational database statement, and wherein processing the SQL statement as a row-major organized relational database statement comprises:

consuming column-major organized database data; and simulating a virtual row-major organized database based on column-major database metadata information associated with the consumed column-major organized database data.

11. The system of claim 10, wherein the program instructions further cause the system to:

process the virtual row-major organized database with a database optimizer engine to generate optimizer statistics; and process the SQL statement based on the optimizer statistics.

12. The system of claim 10, wherein the sort operation of the SQL statement comprises an ORDER BY sort operation.

13. The system of claim 10, wherein the output of the SQL statement comprises a SELECT output of the SQL statement.

* * * * *